(12) United States Patent
Park et al.

(10) Patent No.: US 9,496,731 B2
(45) Date of Patent: Nov. 15, 2016

(54) APPARATUS AND METHOD FOR TRANSMITTING WIRELESS POWER BY USING RESONANT COUPLING AND SYSTEM FOR THE SAME

(71) Applicant: Samsung Electronics Co., Ltd., Gyeonggi-do (KR)

(72) Inventors: Sung-Kweon Park, Gyeonggi-do (KR);
Kil-Soo Ko, Gyeonggi-do (KR);
Ki-Hyun Kim, Gyeonggi-do (KR);
Se-Ho Park, Gyeonggi-do (KR);
Jin-Hyoung Park, Gangwon-do (KR);
Sea-Young Lee, Daegu (KR);
Young-Min Lee, Gyeonggi-do (KR);
Hee-Won Jung, Gyeonggi-do (KR);
Hong-Kweun Kim, Gyeonggi-do (KR);
Seung-Woo Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 345 days.

(21) Appl. No.: 13/747,079

(22) Filed: Jan. 22, 2013

(65) Prior Publication Data
US 2013/0187598 A1 Jul. 25, 2013

(30) Foreign Application Priority Data

Jan. 20, 2012 (KR) .................. 10-2012-0006544
May 2, 2012 (KR) .................. 10-2012-0046226

(51) Int. Cl.
*H02J 7/00* (2006.01)
*H02J 5/00* (2016.01)
*H02J 7/02* (2016.01)

(52) U.S. Cl.
CPC ............ *H02J 7/0042* (2013.01); *H02J 5/005* (2013.01); *H02J 7/0044* (2013.01); *H02J 7/025* (2013.01)

(58) Field of Classification Search
CPC ................................. H02J 7/025; H02J 5/005
USPC ................. 307/104; 320/107–108, 111
See application file for complete search history.

(56) References Cited

U.S. PATENT DOCUMENTS

| 5,219,827 A * | 6/1993 | Higaki | H01P 7/082 |
| | | | 333/219 |
| 6,610,623 B1 * | 8/2003 | Alford | C04B 35/111 |
| | | | 501/127 |

(Continued)

FOREIGN PATENT DOCUMENTS

| KR | 1020060036277 | 4/2006 |
| KR | 1020100015954 | 2/2010 |

(Continued)

OTHER PUBLICATIONS

System Description Wireless Power Transfer, vol. 1: Low Power, Part 1: Interface Definition, Version 1.00 Release Candidate 1, Mar. 2010, (pp. 79).

*Primary Examiner* — Paul Dinh
(74) *Attorney, Agent, or Firm* — The Farrell Law Firm, P.C.

(57) ABSTRACT

Disclosed are an apparatus and a method for charging power using a resonant coupling. The apparatus includes a transmission power converter for converting Direct Current (DC) power to Alternating Current (AC) power, a controller for adjusting a Q factor of a transmission resonator by using a frequency of the converted AC power and a resonant frequency of the transmission resonator and controlling adaptive impedance matching, and a transmission resonator for wirelessly transmitting the converted AC power to a receiver through the adjusted Q factor and the controlled adaptive impedance matching, the transmission resonator having a coil installed in the transmitter.

11 Claims, 11 Drawing Sheets

(56) References Cited

U.S. PATENT DOCUMENTS

| | | | |
|---|---|---|---|
| 2002/0005766 A1* | 1/2002 | Abbas | H01P 7/10 333/99 S |
| 2004/0135655 A1* | 7/2004 | Petrov | H01P 7/10 333/235 |
| 2008/0067874 A1* | 3/2008 | Tseng | A61C 17/224 307/104 |
| 2008/0218314 A1* | 9/2008 | Van Eeden | G06K 19/0701 340/10.1 |
| 2010/0271144 A1* | 10/2010 | McCorquodale | H03B 5/04 331/117 FE |
| 2011/0109263 A1 | 5/2011 | Sakoda et al. | |
| 2011/0127953 A1* | 6/2011 | Walley | G06K 7/10207 320/108 |
| 2011/0241613 A1* | 10/2011 | Ryu et al. | 320/108 |
| 2011/0266881 A1* | 11/2011 | Kim et al. | 307/104 |
| 2012/0169137 A1* | 7/2012 | Lisi | H02J 5/005 307/104 |
| 2012/0248884 A1 | 10/2012 | Karalis et al. | |
| 2012/0262004 A1 | 10/2012 | Cook et al. | |
| 2012/0306269 A1* | 12/2012 | Kim | H02J 7/025 307/11 |
| 2012/0306284 A1* | 12/2012 | Lee et al. | 307/104 |

FOREIGN PATENT DOCUMENTS

| KR | 1020110036639 | 4/2011 |
|---|---|---|
| KR | 1020110051144 | 5/2011 |

* cited by examiner

APPARATUS AND METHOD FOR TRANSMITTING WIRELESS POWER BY USING RESONANT COUPLING AND SYSTEM FOR THE SAME

PRIORITY

This application claims priority under 35 U.S.C. §119(a) to Korean Application Serial No. 10-2012-0006544, which was filed in the Korean Intellectual Property Office on Jan. 20, 2012, and Korean Application Serial No. 10-2012-0046226, which was filed in the Korean Intellectual Property Office on May 2, 2012, the contents of both of which are incorporated herein by reference.

BACKGROUND OF THE INVENTION

1. Field of the Invention

The present invention relates generally to an apparatus and a method for transmitting power, and more particularly, to an apparatus and a method for transmitting wireless power by using a resonant coupling.

2. Description of the Related Art

A wireless power charging technology is currently being used for numerous electronic devices, such as an electric toothbrush, an electric shaver, a mobile phone, and a digital camera. Extensive research is currently being conducted on wireless charging of a large size battery for an electric car and a subway.

The wireless power charging technology generally includes a magnetic field inductive coupling type, which is most popular, an electric field capacitive coupling type, and a Radio Frequency (RF) wave radiation type.

The inductive coupling type has the same principle as that of a transformer, whereby resonant frequencies of the primary coil and the secondary coil are matched with an operating frequency of a power source. Increasing a wireless power transmission distance by increasing a Q factor of each coil is defined as the resonant coupling type. The primary coil is referred to as a transmission resonator and the secondary coil is referred to as a reception resonator.

Data communication between a Tx resonator and an Rx resonator is performed to efficiently charge power in the wireless power charging system. For example, authentication information between the transmitter and the receiver, information on a charged voltage or current, and information on an abnormal state of the receiver are transmitted through a data communication scheme such as in-band communication using a carrier frequency band of wireless power and out-band communication using a separate band (for example, 2.4 GHz Zigbee®).

In the wireless power charging technology using inductive coupling, a coupling efficiency between the Tx coil and the Rx coil is important, and a high power charging efficiency can be acquired when the Tx coil and the Rx coil are adjacent to each other.

The wireless power charging technology using conventional inductive coupling arranges the Tx and the Rx coil by using a permanent magnet or an electric motor. Alternatively, the wireless power charging technology places the Tx coil in an array type, selects the Tx coil closest to the Rx coil when a terminal having the Rx coil approaches, and transmits wireless power to the Rx coil through the selected Tx coil.

FIGS. 1A to 1F illustrate examples of a wireless power charging using the conventional induction coupling type.

FIG. 1A illustrates a transmitter, that is, a charging pad, and FIG. 1B illustrates a receiver, that is, a mobile terminal.

FIG. 1C illustrates a correct example of wirelessly charging power, and FIGS. 1D to 1F illustrate incorrect examples of wirelessly charging power. A transmitter 110 has a coil 111 installed therein and a receiver 120 has a coil 112 installed therein. In order to wirelessly charge power by using the inductive coupling type, positions of the coils of the transmitter and the receiver should be the same as illustrated in FIG. 1C. When coil arrangement states of the transmitter and the receiver are good, efficient wireless power transmission is possible. However, FIGS. 1D to 1F illustrate examples where coil arrangement states of the Tx coil of the transmitter and the Rx coil of the receiver are not good, which results in poor wireless power transmission.

The wireless power charging technology basically requires accurate arrangements of the Tx coil and the Rx coil and has a problem in that a size of the Tx coil and a size of the Rx coil should be almost the same. The Rx coil is located in a main body of a tablet Personal Computer (PC), but internal components of the main body of the tablet PC may prevent the Rx coil from being located in the center thereof. In this case, there is a limitation in the arrangements of the Tx coil and the Rx coil. For example, when the tablet PC is placed on the wireless charging pad, if the tablet PC is placed with a rotation of 90 degrees or placed in such a manner that a part of a main body of the tablet PC is not in contact with the wireless charging pad, arrangement states of the Tx coil within the wireless charging pad and the Rx coil within the tablet PC are not good, thereby rapidly decreasing the efficiency and stopping the wireless power transmission.

SUMMARY OF THE INVENTION

The present invention has been made to solve the problems occurring in the prior art and provides an apparatus and a method for transmitting wireless power using a resonant coupling.

In accordance with an aspect of the present invention, an apparatus for transmitting wireless power of a transmitter using a resonant coupling includes a transmission power converter for converting Direct Current (DC) power to Alternating Current (AC) power, a controller for adjusting a Q factor of a transmission resonator by using a frequency of the converted AC power and a resonant frequency of the transmission resonator and controlling adaptive impedance matching, and a transmission resonator for wirelessly transmitting the converted AC power to a receiver through the adjusted Q factor and the controlled adaptive impedance matching, the transmission resonator having a coil installed in the transmitter.

In accordance with another aspect of the present invention, a method of transmitting wireless power of a transmitter using a resonant coupling includes converting DC power to AC power, adjusting a Q factor of a transmission resonator by using a frequency of the converted AC power and a resonant frequency of the transmission resonator and controlling adaptive impedance matching, and wirelessly transmitting the converted AC power to a receiver through the adjusted Q factor and the controlled adaptive impedance matching, wherein a coil is installed in the transmitter.

In accordance with another aspect of the present invention, a system for charging wireless power using a resonant coupling includes a transmitter for converting DC power to AC power, matching a frequency of the converted AC power with a resonant frequency of a transmission resonator, and transmitting the converted AC power to a receiver, the transmitter having a coil installed therein, and a receiver for converting the received AC power to DC power to charge a battery.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1A:
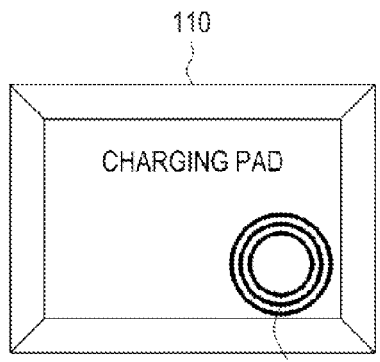
FIGS. 1A to 1F illustrate examples of the wireless power charging using the conventional inductive coupling type.
Figure 1B:
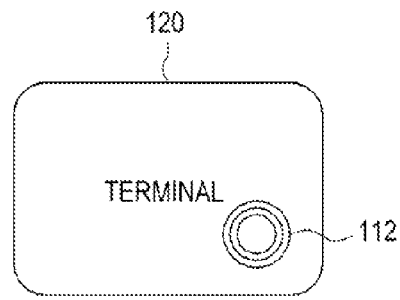
Figure 1C:
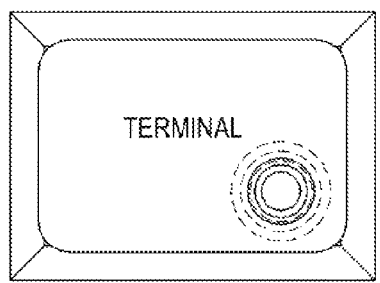
Figure 1D:
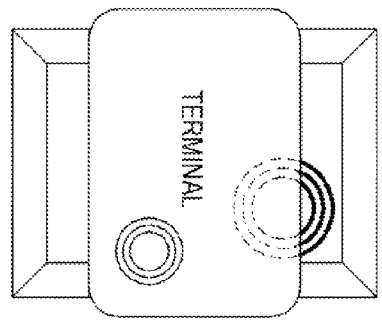
Figure 1E:
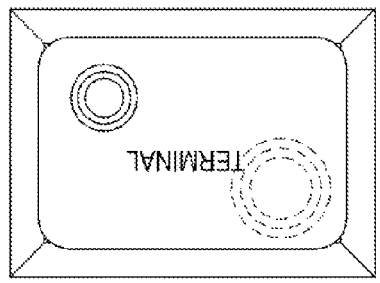
Figure 1F:
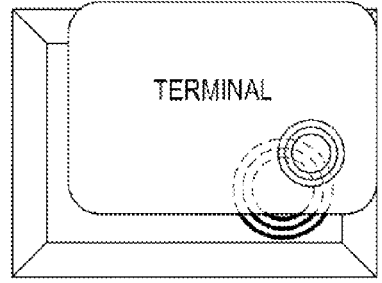

Hereinafter, embodiments of the present invention will be described in detail with reference to the accompanying drawings. In the following description, the same elements will be designated by the same reference numerals although they are shown in different drawings. In the following description, a detailed description of known functions and configurations incorporated herein will be omitted for the sake of clarity and conciseness.

The terms described below are defined considering functions performed in the present invention and may vary depending on the user, intention of the user, or practice.

Figure 2:
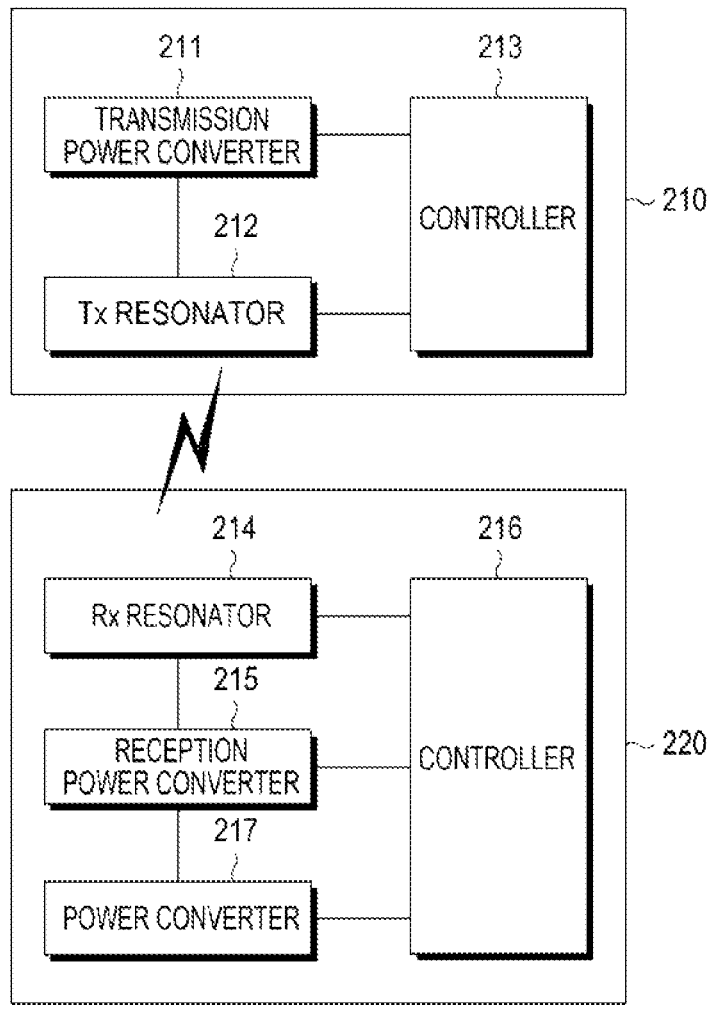
FIG. 2 illustrates a wireless power charging system using a resonant coupling according to an embodiment of the present invention.

FIG. 2 illustrates a wireless power charging system using a resonant coupling according to an embodiment of the present invention. FIG. 2 includes a transmitter 210 for transmitting wireless power and a receiver 220 for receiving, and then charging, the wireless power.

The transmitter 210 includes a transmission power converter 211 for converting DC power to AC power, a Tx resonator 212 for generating an electromagnetic field through the AC power and generating a transmission resonance for transmitting the wireless power to the receiver, and a controller 213 for adjusting a Q factor and controlling adaptive impedance matching in order to increase a transmission power efficiency and match a frequency of the converted AC power with a resonant frequency of the Tx resonator 212.

The receiver 220 includes an Rx resonator 214 connected to the Tx resonator 212 of the transmitter 210 to receive wireless power, a reception power converter 215 for converting AC power received through the Rx resonator to DC power, a controller 216 for adjusting a Q factor and controlling adaptive impedance matching in order to increase a reception power efficiency, and a power converter (or battery) 217 for charging the converted DC power under a control of the controller 216.

The transmission power converter 211 of the charging pad converts DC power to AC power. The Tx resonator 212 generates an electromagnetic field through the converted AC power and generates a resonance to transmit wireless power to the receiver. That is, the Tx resonator 212 receives the converted AC power from the transmission power converter 211 to generate induced electromotive force. The Tx resonator 212 is installed in a circumference of a surface coming into contact with the receiver, to maximize the power transmission efficiency.

The controller 213 adjusts the Q factor and controls the adaptive impedance matching in order to increase the efficiency of power transmitted through the Tx resonator 212. The Q factor adjustment and the adaptive impedance matching will now be described in more detail.

According to the present invention, a high Q factor and the adaptive impedance matching are required in the Tx coil and the Rx coil design. The controller 213 performs the above-described functions. That is, the controller adjusts the Q factor of the transmission resonator and controls the adaptive impedance matching by using the frequency of the AC power converted by the transmission power converter and the resonant frequency of the transmission resonator. The controller 213 matches the frequency of the AC power with the resonant frequency of the transmission resonator by adjusting the Q factor and controlling the adaptive impedance matching. The Q factor is adjusted by multiplying the resonant frequency of the transmission resonator by inductance and then dividing the result by a radiation loss. The Q factor may be controlled as defined in Equation (1) and Equation (2) below.

In addition, the controller 213 controls inductance and capacitance of the transmission resonator and controls adaptive impedance matching by matching the resonance frequency changed according to a distance and an arrangement between the transmission resonator of the transmitter and the reception resonator of the receiver with the frequency of the AC power.

A high Q factor Tx coil and Rx coil have high power transmission efficiency in a particular frequency. The Tx coil and the Rx coil have an inductance (L) component and a capacitance (C) component, respectively, so that an LC resonance occurs in the resonant frequency. In addition, when Q factors of the Tx resonator 212 and the Rx resonator 214 increase, an ohmic loss generated in the resonator itself may be reduced. When the Q factors increase, it is possible to reduce lost components since the electric field generated from the resonator is radiated on an adjacent field while conserving energy. Accordingly, it is possible to achieve efficient wireless power transmission through the design of the resonator having a high Q factor in spite of a low coupling efficiency of 0.1. The Q factor may be defined as shown in Equation (1) as follows.

$$Q = \frac{\omega L}{R} \quad (1)$$

In Equation (1), ω=2πf, f denotes a resonant frequency, L denotes inductance, and R denotes a radiation loss component.

Each of L and C included in the resonator has Equivalent Series Resistance (ESR), and R decreases and Q increases as the ESR is reduced. R increases as the radiation loss increases in the resonator.

Accordingly, the resonator design is important to the wireless power charging apparatus according to the present invention to increase the Q factor, and the resonator design is achieved by the controller 213.

The controller 213 performs adaptive impedance matching as well as the resonator design. The Q factor for the impedance matching is expressed as defined in Equation (2) as follows.

$$Q = \frac{f_r}{\Delta f} = \frac{\text{Resonant frequency}}{\text{3 dB bandwidth}} \quad (2)$$

In Equation (2), $f_r$ denotes a resonant frequency and Δf denotes a 3 dB bandwidth, which is measured at 3 dB below the power of the resonant frequency corresponding to maximum power.

It can be known from Equation (2) that the Q factor is higher as the 3 dB bandwidth is lower, which indicates that the wireless power can be physically transmitted with high efficiency in a particular frequency.

Accordingly, wireless power transmission with the highest efficiency can be achieved when power of the same frequency as the resonant frequency of the resonator is transmitted. However, in the wireless power transmission system, the resonant frequency varies depending on a distance and an arrangement state between the Tx resonator and the Rx resonator, not being fixed to one value. The resonant frequency varies as that mutual inductance or mutual capacitance varies.

When the resonant frequency is changed, the resonant frequency becomes different from the frequency of originally set power and efficient power transmission is difficult. Particularly, since the resonator having a higher Q factor shows a larger efficiency difference in spite of a slight frequency difference, it is required to reduce the frequency difference. When a value of the resonant frequency is changed through adaptive impedance matching, the resonant frequency can be adaptively matched with the frequency of the power, and high efficiency wireless power transmission can be achieved.

The receiver 220 is a mobile terminal and includes the Rx resonator 214 for receiving wireless power, the reception power converter 215 for converting received AC power to DC power, the power converter (or battery) 217 for storing the converted DC power, and the controller 216 for performing the same operations as those of the controller 213 of the transmitter. Since the descriptions of the operations of the controller 216 are the same as those of the operations of the controller 213 of the transmitter, the descriptions will be omitted.

FIGS. 3A to 3E illustrate examples of the wireless power charging using the resonant coupling according to an embodiment of the present invention.

Figure 3A:
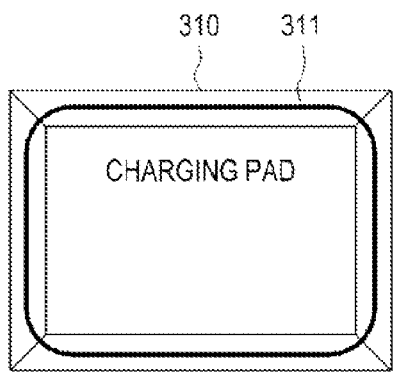
FIGS. 3A to 3E illustrate examples of a wireless power charging using a resonant coupling according to an embodiment of the present invention.
Figure 3B:
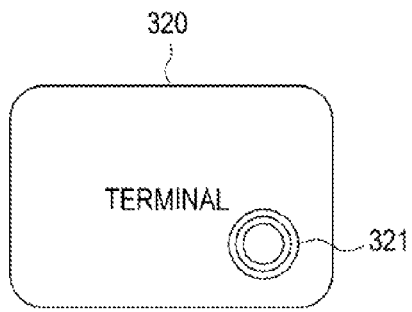

FIG. 3A shows a transmitter 310 for transmitting wireless power, and FIG. 3B shows a receiver 320 for receiving wireless power, both of which using resonant coupling according to an embodiment of the present invention. The transmitter and the receiver have resonators 311 and 321 for transmitting and receiving wireless power, respectively. Each of the resonators are installed in a position to efficiently transmit wireless power. For example, the resonator 311 may be installed in the transmitter over all edges of an upper surface of the transmitter. The resonator may be installed in any position where the receiver can be easily placed.

Figure 3C:
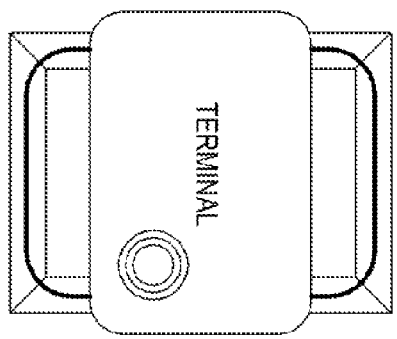
Figure 3D:
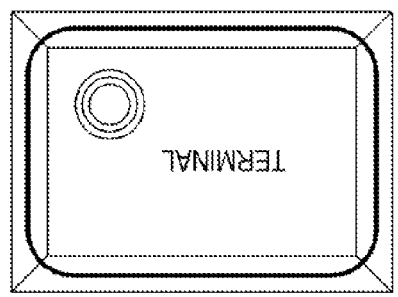
Figure 3E:
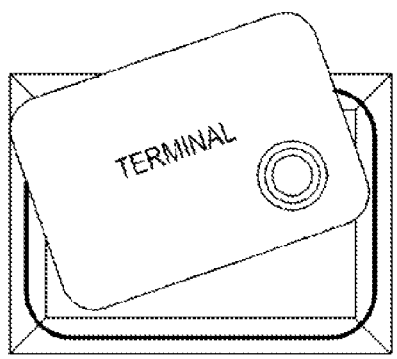

FIG. 3C illustrates an example of the transmitter horizontally standing and the receiver vertically standing, FIG. 3D illustrates an example of the transmitter horizontally standing and the receiver being upside down, and FIG. 3E illustrates an example of the transmitter horizontally standing and the receiver standing obliquely with respect to the transmitter.

Figure 4:
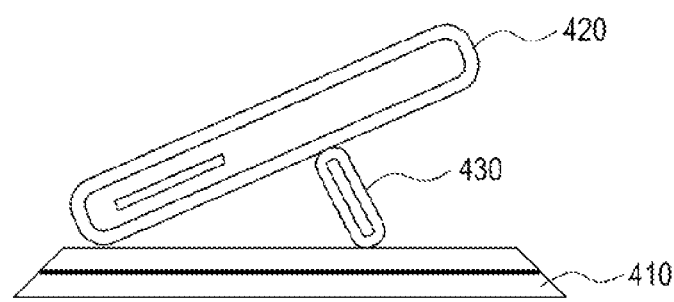
FIG. 4 illustrates wireless power charging when a receiver stands on a transmitter by a supporter according to an embodiment of the present invention.

FIG. 4 illustrates an example of the wireless power charging when a receiver stands on a transmitter by a supporter according to an embodiment of the present invention.

As illustrated in FIG. 4, even when a receiver 420 stands on a transmitter 410 by a supporter 430, wireless power may be transmitted/received to/from the Rx resonator of the receiver through the transmitter, that is, the Tx resonator installed in the charging pad. An angle at which the receiver stands may be determined by the supporter or may be controlled by the user. The Tx coil is installed over a side circumference of the transmitter.

Figure 5:
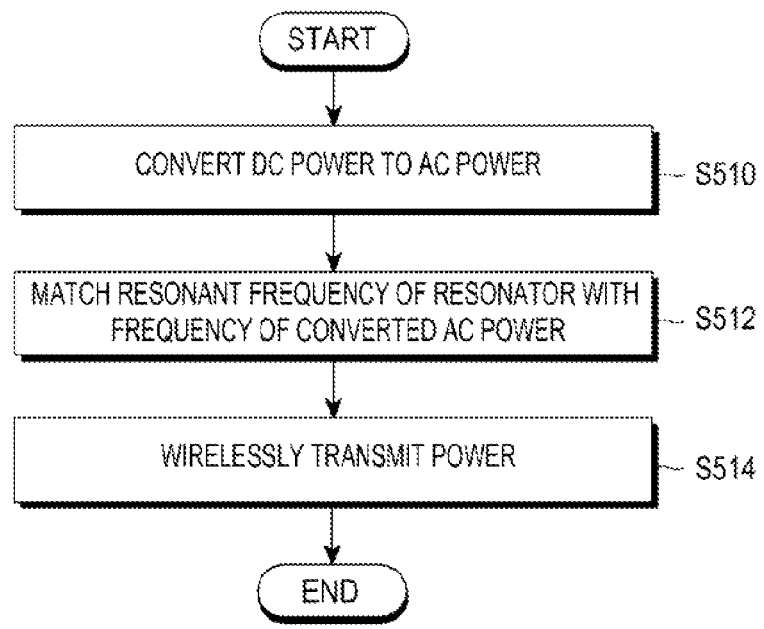
FIG. 5 illustrates a wireless power charging method using a resonant coupling according to an embodiment of the present invention.

FIG. 5 illustrates a wireless power charging method using the resonant coupling according to an embodiment of the present invention.

The transmitter converts DC power to AC power in step S510.

A frequency of the converted AC power is matched with a resonant frequency of the transmission resonator in step S512. Specifically, a Q factor of the transmission resonator is adjusted and adaptive impedance matching is controlled using the frequency of the converted AC power and the resonant frequency of the transmission resonator. The frequency of the AC power is matched with the resonant frequency of the transmission resonator by adjusting the Q factor and the adaptive impedance matching. The Q factor is adjusted by multiplying the resonant frequency of the transmission resonator by inductance and then dividing the result by a radiation loss, and is also adjusted by dividing the resonant frequency of the transmission resonator by a frequency of a point which is 3 dB lower than a maximum value of the converted AC power. In addition, inductance and capacitance of the transmission resonator is controlled and the adaptive impedance matching is controlled by matching the resonant frequency changed according to a distance and an arrangement between the transmission resonator of the transmitter and the reception resonator of the receiver with the frequency of the AC power.

The transmitter wirelessly transmits the converted AC power to the receiver by using the transmission resonator matched with the resonant frequency in step S514. The receiver wirelessly receives the power through the Rx resonator 214, and the reception power converter 215 converts the received AC power to DC power and stores the DC power in the battery 217.

Figure 6:
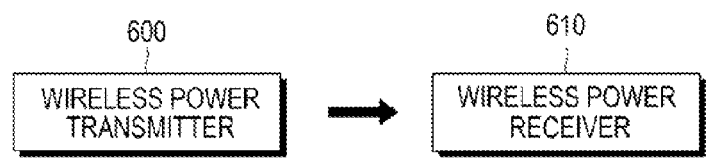
FIG. 6 describes a general operation of the wireless charging system.

FIG. 6 describes a general operation of the wireless charging system. Similar to FIG. 1, the wireless charging system includes a wireless power transmitter 600 and one or more wireless power receivers 610.

The wireless power transmitter 600 may wirelessly transmit power to the one or more wireless power receivers 610. Specifically, the wireless power transmitter 600 may wirelessly transmit power only to an authenticated wireless power receiver having performed an authentication process. The wireless power transmitter 600 may configure an electrical connection with the wireless power receiver 610. For example, the wireless power transmitter 600 may transmit wireless power as an electromagnetic wave to the wireless power receiver 610.

The wireless power transmitter 600 performs bidirectional communication with the wireless power receiver 610. The wireless power transmitter 600 and the wireless power receiver 610 process or transmit/receive a packet including a frame. Particularly, the wireless power receiver is a mobile communication terminal, a Personal Data Assistant (PDA), a Portable Media Player (PMP), or a smart phone.

The wireless power transmitter 600 may wirelessly provide power to the plurality of wireless power receivers 610, such as through a resonance technique. When the wireless power 600 adopts the resonance technique, a distance between the wireless power transmitter 600 and the wireless power receiver 610 is preferably no more than 30 m. When the wireless power transmitter 600 adopts the electric field induction type, distances between the wireless power transmitter 600 and the plurality of wireless power receivers 610 are preferably no more than 10 m.

The wireless power receiver 610 may receive wireless power from the wireless power transmitter 600 and charge the battery arranged within the wireless power receiver 610. The wireless power receiver 610 may transmit, for example, a signal making a request for wireless power transmission, information required for wireless power reception, state information on the wireless power receiver, or control information on the wireless power transmitter 600 to the wireless power transmitter 600. Information on the transmission signal will be described below in more detail.

Each of the wireless power receivers 610 may transmit a message indicating its charging state to the wireless power transmitter 600.

The wireless power transmitter 600 includes a display and displays the state of each of the wireless power receivers 610 based on the message received from each wireless power receiver 610. The wireless power transmitter 600 may also display an expected time when each of the wireless power receivers 610 will be completely charged.

The wireless power transmitter 600 transmits a control signal for disabling a wireless charging function to each of the wireless power receivers 610, which disables the wireless charging function upon receipt of the control signal.

Figure 7A:
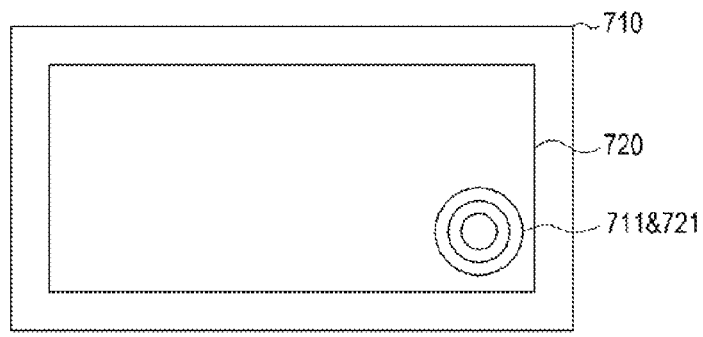
FIGS. 7A to 7D describe a comparative example according to the present invention.

FIG. 7A is a conceptual diagram of a comparative example according to the present invention. As illustrated in FIG. 7A, a wireless power transmitter 710 includes a wireless power transmission coil 711, and a wireless power receiver 720 includes a wireless power reception coil 721. The wireless power transmission coil 711 of the wireless power transmitter 710 and the wireless power reception coil 721 of the wireless power receiver 720 configure mutual inductance. The wireless power transmission coil 711 transmits wireless power to the wireless power reception coil 721. The wireless power receiver 720 according to the comparative example of the present invention should be selectively arranged in a position of the wireless power transmitter 710.

For example, the wireless power receiver 720 should be arranged such that a position and a direction of the wireless power reception coil 721 correspond to a position and a direction of the wireless power transmission coil 711 as illustrated in FIG. 7A, since the wireless power transmission/reception efficiency is rapidly reduced as the distance between the wireless power transmission coil 711 and the wireless power reception coil 721 increases. Accordingly, the wireless power transmitter 710 according to the comparative example further includes a housing and a fixing member [not shown] for guiding the wireless power receiver 720 to be disposed in a particular direction and position.

Figure 7B:
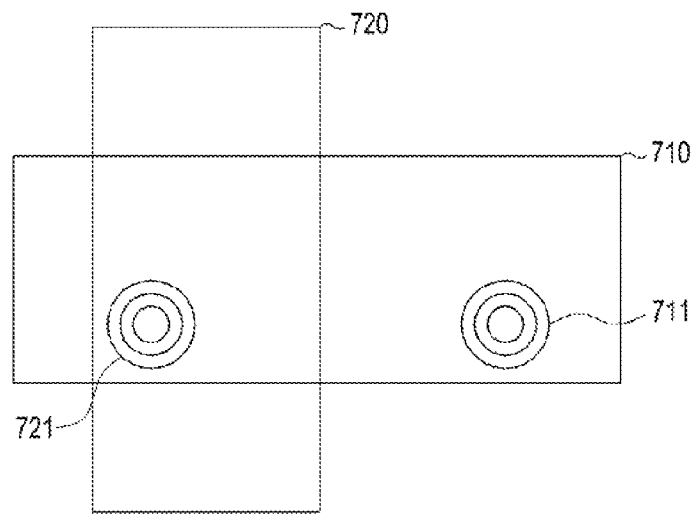
Figure 7C:
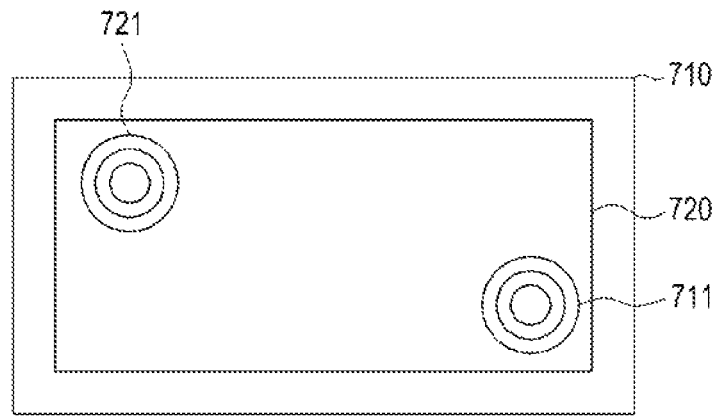
Figure 7D:
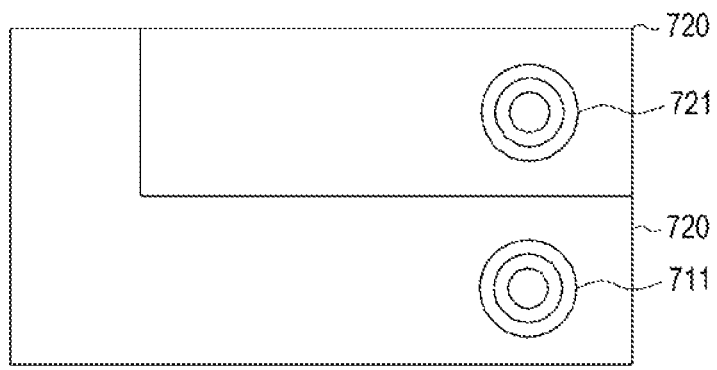

FIGS. 7B to 7D are conceptual diagrams for describing the wireless power transmission coil 711 and the wireless power reception coil 721 which are not aligned with each other according to the comparative example of the present invention.

As illustrated in FIG. 7B, the user may dispose the wireless power receiver 720 in a direction different from that of the wireless power transmitter 710, and in this case, the wireless power transmission coil 711 and the wireless power reception coil 721 are spaced apart from each other by a preset distance or longer, so that the wireless power transmission/reception efficiency is rapidly reduced. The wireless power receiver 720 may be disposed in a different direction from that of the wireless power transmitter 710 as illustrated in FIG. 2C or 2D. Similarly, the wireless power transmission coil 711 and the wireless power reception coil 721 are spaced apart from each other by a preset distance or longer, so that the wireless power transmission/reception efficiency is rapidly reduced. In the comparative examples, since the user should always dispose the wireless power transmitter 710 and the wireless power receiver 720 in a particular position and a particular direction, the user encounters an inconvenience.

Figure 8:
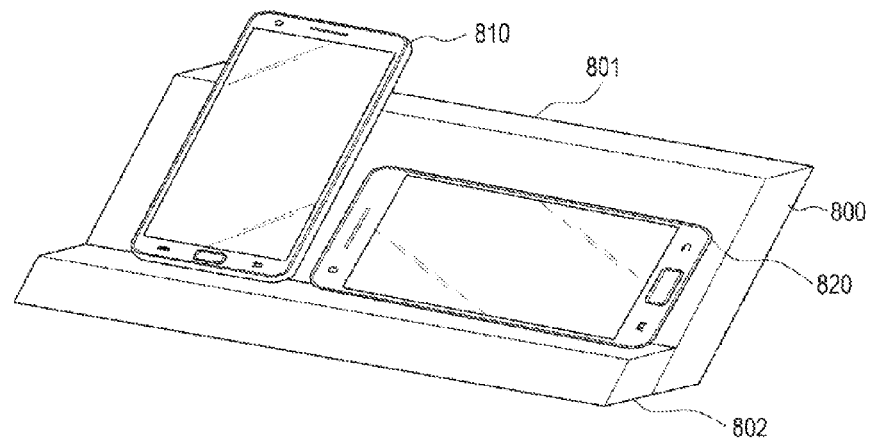
FIG. 8 describes arrangement states of the wireless power transmitter and the wireless power receiver according to the present invention.

FIG. 8 describes arrangement states of the wireless power transmitter and the wireless power receiver according to the present invention.

As illustrated in FIG. 8, a wireless power transmitter 800 according to the present invention may transmit wireless power with a high efficiency irrespective of an arrangement position and an arrangement direction of wireless power receivers 810 and 820. The high efficiency may refer to substantially the same efficiency as a maximum efficiency with which wireless power is transmitted when the wireless power transmitter 800 and the wireless power receivers 810 and 820 are ideally arranged rather than a particular efficiency. That is, the wireless power transmitter 800 according to the present invention can transmit wireless power with a substantially maximum efficiency even though arrangement positions and arrangement directions of the wireless power receivers 810 and 820 are changed.

As illustrated in FIG. 8, wireless power can be transmitted with the same efficiency both when the wireless power receiver 810 is disposed in a different direction than that of the wireless power transmitter 800 and when the wireless power receiver 820 is disposed in the same direction as that of the wireless power transmitter 800. The wireless power transmitter 800 can transmit wireless power with the same efficiency even when the wireless power receivers 810 and 820 are disposed in different directions.

The wireless power transmitter 800 includes a supporter 802 for supporting and adjusting an angle of the wireless power receivers 810 and 820. The angle between the supporter 802 and a wireless power transmission platform 801 may preferably range from 0° to 90° and may be controlled, for example, in 10° increments.

The wireless power transmission platform 801 may be connected to one surface of the supporter 802, and may include various types of circuits or devices as well as the power transmission coil for wireless power within the wireless power transmission platform 801, and a receiving means for receiving the circuits or devices. The components included in the wireless power transmission platform 801 will be described below in more detail.

Figure 9:
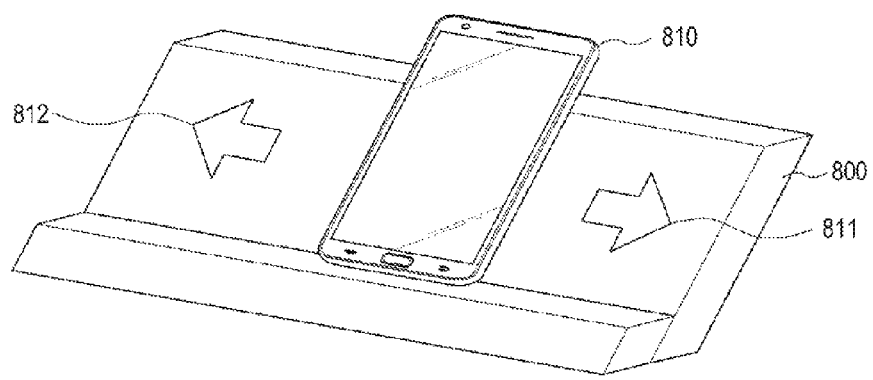
FIG. 9 describes arrangement states of the wireless power transmitter and the wireless power receiver according to the present invention.

FIG. 9 describes arrangement states of the wireless power transmitter and the wireless power receiver according to the present invention. As illustrated in FIG. 9, the wireless power transmitter 800 transmits wireless power to the wireless power receiver 810 with a predetermined efficiency. The user may move an arrangement position of the wireless power receiver 810 in a right direction 811 or a left direction 812 in which the supporter of the wireless power transmitter 800 extends. The wireless power transmitter 800 according to the present invention can transmit wireless power with substantially the same efficiency as the predetermined efficiency even though the arrangement position of the wireless power receiver 810 is changed.

Figure 10A:
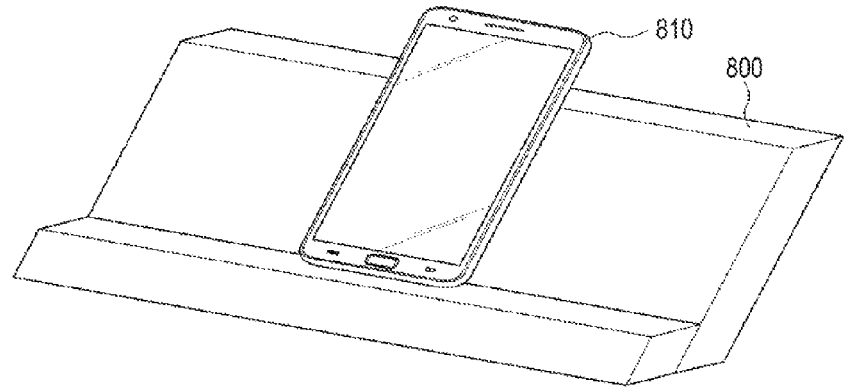
FIGS. 10A and 10B are conceptual diagrams for describing arrangement states of the wireless power transmitter and the wireless power receiver.
Figure 10B:
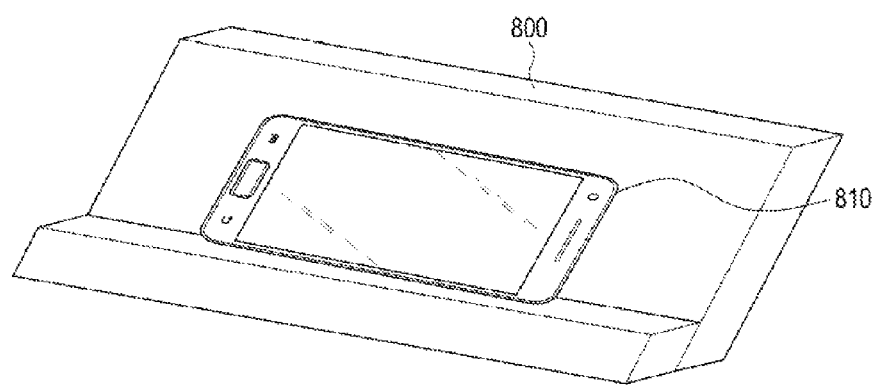

FIGS. 10A and 10B are conceptual diagrams for describing arrangement states of the wireless power transmitter and the wireless power receiver.

As illustrated in FIG. 10A, the wireless power transmitter 800 transmits wireless power to the wireless power receiver 810 with a predetermined efficiency. The user may change an arrangement direction of the wireless power receiver 810 to a direction equal or orthogonal to the extending direction of the supporter of the wireless power transmitter 800.

FIG. 10A is a conceptual diagram illustrating that the wireless power receiver 810 is arranged in the direction equal to the extending direction of the supporter of the wireless power transmitter 800. FIG. 10B is a conceptual diagram illustrating that the wireless power receiver 810 is arranged in the direction orthogonal to the extending direction of the supporter of the wireless power transmitter 800. The wireless power transmitter 800 according to the present invention can transmit wireless power with substantially the same efficiency as the predetermined efficiency even though the arrangement direction of the wireless power receiver 810 is changed.

Figure 11:
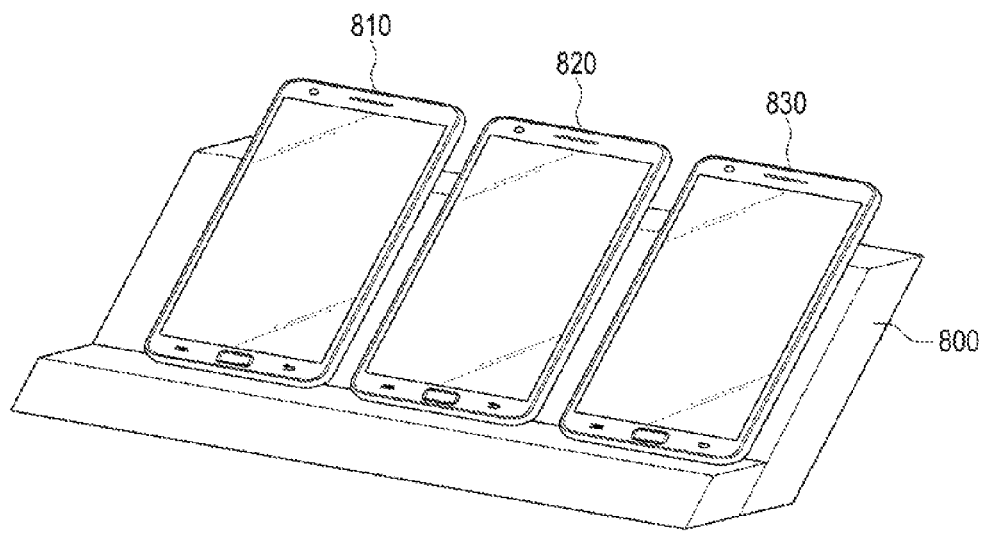
FIG. 11 describes arrangement states of the wireless power transmitter and the wireless power receiver according to the present invention.

FIG. 11 describes arrangement states of the wireless power transmitter and the wireless power receiver according to the present invention. Similar to FIG. 8, a plurality of wireless power receivers 810, 820, and 830 may be arranged on the wireless power transmitter 800, which transmits wireless power to each of the plurality of wireless power receivers 810, 820, and 830.

The wireless power transmitter 800 according to the present invention may not include the power transmission coil corresponding to each of the wireless power receivers 810, 820, and 830. That is, the wireless power transmitter 800 according to the present invention may include, for example, one power transmission coil which transmits wireless power to each of the wireless power receivers 810, 820, and 830 with substantially the same efficiency.

Types of the wireless power receivers 810, 820, and 830 may be different from each other. For example, the wireless power receivers 810, 820, and 830 may have different power amounts of the received wireless power. The wireless power transmitter 800 according to the present invention can transmit wireless power to each of the wireless power receivers 810, 820, and 830 with substantially the same efficiency even when the types of the wireless power receivers 810, 820, and 830 are different.

Figure 12A:
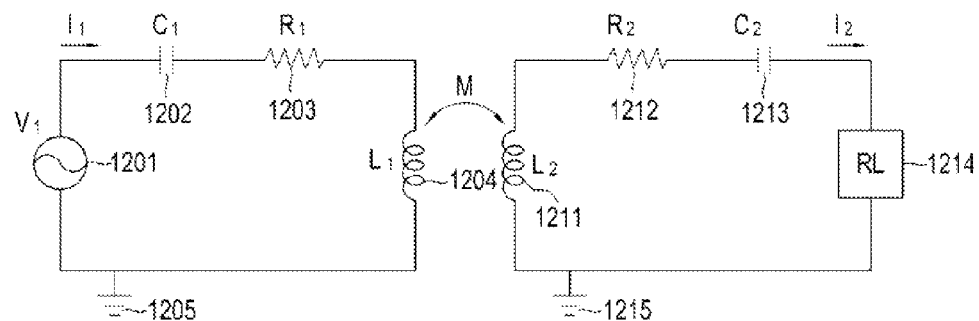
FIGS. 12A to 12C are circuit diagrams of the wireless power transmitter and the wireless power receiver according to various embodiments of the present invention.
Figure 12B:
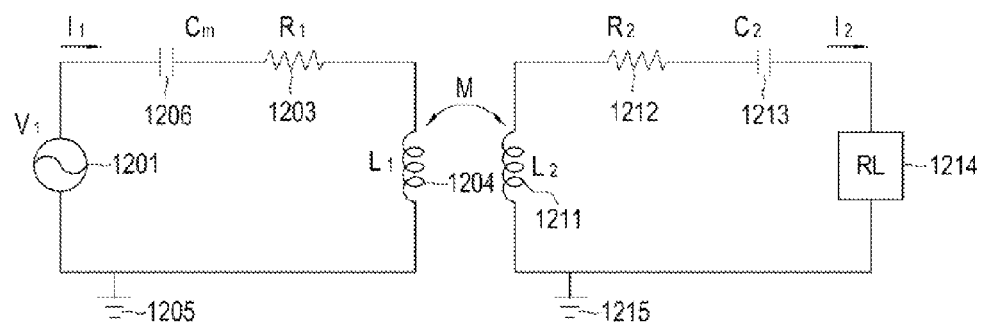
Figure 12C:
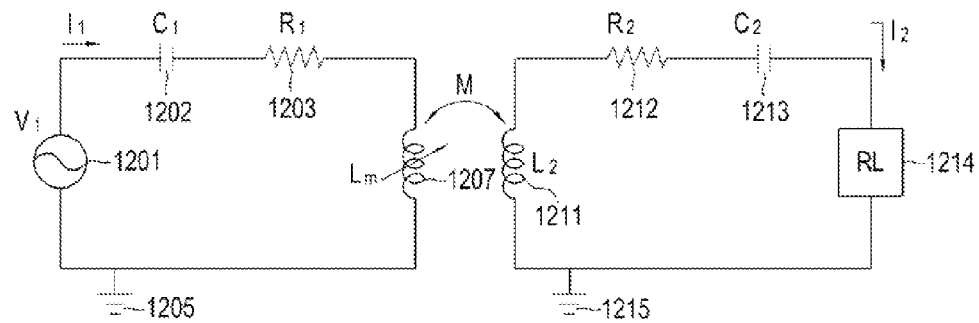

FIGS. 12A to 12C are circuit diagrams of the wireless power transmitter and the wireless power receiver according to embodiments of the present invention.

As illustrated in FIG. 12A, the wireless power transmitter includes a power provider 1201, a capacitor unit 1202, a resistor unit 1203, a coil unit 1204, and a grounding unit 1205. The wireless power receiver includes a coil unit 1211, a resistor unit 1212, a capacitor unit 1213, a load resistor unit 1214, and a grounding unit 1215.

The power provider 1201 provides AC type power having a preset size V1. The power may have a current of a predetermined size I1. One end of the power provider 1201 may be connected to one end of the capacitor unit 1202 which may have a capacitance C1. The other end of the capacitor unit 1202 may be connected to one end of the resistor unit 1203, which is Equivalent Series Resistance (ESR) of the coil unit 1204 and may have a resistance value of R1. The other end of the resistor unit 1203 may be connected to one end of the coil unit 1204, which has an inductance L1. The other end of the coil unit 1204 may be connected to the grounding unit 1205, and the other end of the power provider 1201 may also be connected to the grounding unit 1205.

The wireless power may be received by another coil unit 1211 by the oscillation of the coil unit 1204. The coil unit 1211 may have inductance of L2. One end of the coil unit 1211 may be connected to one end of the resistor unit 1212, which is ESR of the coil unit 1211 or the capacitor unit 1213 and may have a resistance value R2. The other end of the resistor unit 1212 may be connected to one end of the capacitor unit 1213, which has capacitance of C2. The other end of the capacitor unit 1213 may be connected to one end of the load resistor unit 1214, which has a resistance value of RL. The other end of the load resistor unit 1214 may be connected to the grounding unit 1215. The other end of the coil unit 1211 may also be connected to the grounding unit 1215.

The two coil units 1204 and 1211 may be loosely coupled, such that a coupling efficiency is determined as a value less than or equal to 0.3. As the two coil units 1204 and 1211 are loosely coupled, each of the two coil units 1204 and 1211 can transmit/receive wireless power without a size limitation.

For the loose coupling of the two coil units 1204 and 1211, each of the two coil units 1204 and 1211 has a high quality factor. For example, the coil unit 1204 may have a quality factor value greater than or equal to 100, and the coil unit 1211 may have a quality factor value greater than or equal to 50. Thus, an ohmic loss generated in a metal of the resonator itself may be reduced. It may be possible to reduce lost components since the electric field generated from the resonator is radiated on an adjacent field while conserving energy. An Equation of the quality factor may be expressed as defined in Equation (1), discussed above.

Each of L and C configuring the resonator has ESR, and a resistance loss may be generated due to the ESR. The wireless power transmitter according to the present invention can reduce total loss components by reducing the resistance loss, thereby increasing the quality factor.

The wireless power transmitter according to another embodiment of the present invention can increase the quality factor by reducing a radiation loss. For example, the wireless power transmitter may design the resonator such that a resonance is generated in an odd normal mode frequency, and accordingly, reduce the radiation loss and increase the quality factor. The quality factor increasing methods are only illustrative, and it will be easily understood by those skilled in the art that modifications may be made by applying various examples of the known quality factor increasing methods. The scope of the present invention is not limited to the aforementioned quality factor increasing methods.

As described above, the wireless power receiver also has a quality factor value greater than or equal to 50, and the resonator of the wireless power receiver may also increase the quality factor according to the above methods and other various methods.

The wireless power transmitter may further include an impedance matching circuit. A circuit analysis of the wireless power transmitter in FIG. 12A may be expressed by Equation (5) as follows.

$$V_1 = \left(R_1 + j\omega L_1 + \frac{1}{j\omega C_1}\right)I_1 - j\omega M I_2 \quad (5)$$

In Equation (5), ω denotes a resonant angle frequency, and M denotes mutual inductance between the coil unit 1204 and the coil unit 1211.

In Equation (5), $$R_1 + j\omega L_1 + \frac{1}{j\omega C_1}$$

may be indicated by $Z_{11}$.

The circuit analysis in the wireless power receiver may be expressed as defined in Equation (6) as follows.

$$0 = -j\omega M I_1 + \left(R_2 + j\omega L_2 - \frac{1}{j\omega C_2} + R_L\right)I_2 \quad (6)$$

In Equation (6), $$R_2 + j\omega L_2 - \frac{1}{j\omega C_2} + R_L$$

may be indicated by $Z_{22}$.

Equation (7) may be derived from Equations (5) and (6), as follows.

$$V_1 = \left(Z_{11} + \frac{\omega^2 M^2}{Z_{22}}\right)I_1 = (Z_{11} + Z_r)I_1 \quad (7)$$

In Equation (7), $Z_r$ is $$\frac{\omega^2 M^2}{R_2 + j\omega L_2 - \frac{1}{j\omega C_2} + R_L}.$$

In the wireless power transmitter, the resonance may be generated when $Z_{11}+Z_r$ is minimized. However, the mutual inductance M may be changed according to arrangement states and the amount of wireless power transmitters and receivers. Accordingly, the wireless power transmitter may further include the impedance matching circuit to adaptively control such that $Z_{11}+Z_r$ is minimized.

FIGS. 12B and 12C are circuit diagrams of the wireless power transmitter further including the impedance matching circuit and the wireless power receivers according to embodiments of the present invention.

As illustrated in FIG. 12B, the wireless power transmitter includes a variable capacitor unit 1206. Capacitance Cm of the variable capacitor unit 1206 may be changed according to a control of the controller (not shown). $C_1$ of $Z_{11}$ may be changed according to the change in the capacitance of the variable capacitor unit 1206. Nevertheless, $Z_{11}+Z_r$ may remain in a minimum state. The variable capacitor unit 1206 may be arranged in the position of the capacitor unit 1202 of FIG. 12A.

As illustrated in FIG. 12C, the wireless power transmitter includes a variable coil unit 1207. Inductance Lm of the variable coil unit 1207 may be changed according to a control of the controller (not shown). $L_1$ of $Z_{11}$ may be changed according to change in the inductance of the variable coil unit 1206. Despite changes in M and $R_L$, $Z_{11}+Z_r$ may remain in a minimum state. The variable coil unit 1207 may be arranged in the position of the coil part 1204 of FIG. 12A.

For example, the controller (not shown) may monitor impedance in a particular position of the wireless power transmitter, and maintain the impedance at a minimum state by changing capacitance or inductance of the wireless power transmitter according to a monitoring result. The controller (not shown) may change capacitance or inductance based on the monitoring result and a lookup table for a device change value.

As described above, the wireless power transmitter may have a high quality factor and be loosely coupled with the wireless power receiver. The wireless power transmitter may have an impedance matching circuit to maintain the impedance in the minimum state. Accordingly, the wireless power transmitter can transmit wireless power without regard to the arrangement position and arrangement direction of the wireless power receiver. The wireless power transmitter can transmit wireless power without regard to the number of wireless power receivers. That is, the wireless power transmitter can transmit wireless power to a plurality of wireless power receivers even through only one coil.

Figure 13:
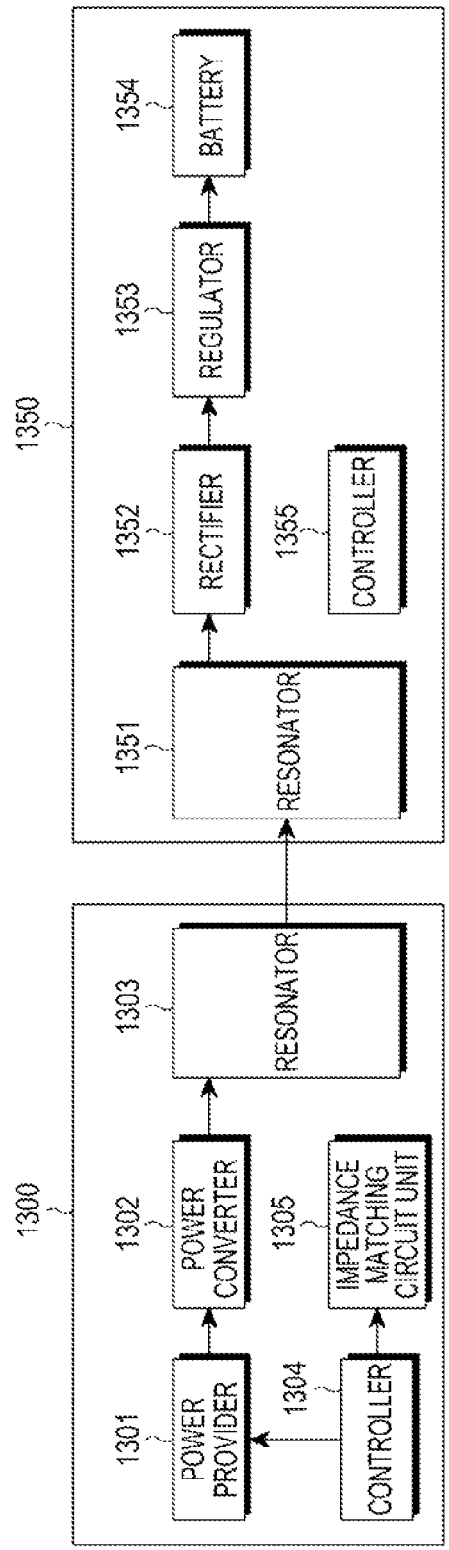
FIG. 13 is a block diagram of the wireless power transmitter and the wireless power receiver according to an embodiment of the present invention.

FIG. 13 is a block diagram of the wireless power transmitter and the wireless power receiver according to an embodiment of the present invention.

As illustrated in FIG. 13, the wireless power transmitter 1300 includes a power provider 1301, a power converter 1302, a resonator 1303, a controller 1304, and an impedance matching circuit unit 805. A wireless power receiver 1350 includes a resonator 1351, a rectifier 1352, a regulator 1353, a battery 1354, and a controller 1355.

The power provider 1301 outputs DC type power having a preset voltage. The power converter 1302 converts the power in the DC type received from the power provider 1301 to power of an AC type for the resonance. The controller 1304 monitors impedance in a position of the wireless power transmitter 1300 and controls the impedance matching circuit unit 1305 to allow a monitoring result to have a minimum value.

For example, the impedance matching circuit unit 1305 may perform impedance matching to allow $Z_{11}+Z_r$ of Equation (7) to be minimized, based on the controller 1304. The impedance matching circuit unit may be implemented based on a combination of at least one capacitor and at least one coil.

The resonator 1303 may transmit input power in the AC type to another resonator 1351.

The resonator 1351 receives wireless power from the wireless power transmitter 1300 and a ping signal from a wireless power supplier, and starts driving by using energy of the received ping signal. A size of the resonator 1351 may be implemented to be 70% of a size of the resonator 1303 or smaller.

The rectifier 1352 may convert a received reception signal in an AC waveform to a reception signal in a DC waveform through a rectification operation. The rectifier 1352 may be implemented by a known rectification means, such as a diode, and it will be easily understood by those skilled in the art that there is no limitation in the means as long as the means can perform the rectification.

The regulator 1353 transfers rectified wireless power to the battery 1354 with a uniform efficiency. The regulator 1353 properly controls a transmission rate of the power so that excessive voltages or currents are not applied to the battery 1354 for a short time. The regulator 1353 increases or decreases the voltage or current of the reception signal to the voltage or current requested by the battery 1354.

The battery 1354 is a means for using or storing power.

Although not illustrated, FIG. 13 may further include a converting means for converting the voltage to a voltage used by the battery 1354.

The controller 1355 may control a general operation of the wireless power receiver 1350 based on an algorithm, a program, or an application read from a storage unit (not shown).

A storage unit (not shown) may be a Non-Volatile Memory (NVM) such as a Solid State Disk (SSD), a flash memory card or a Read Only Memory (ROM), and a volatile memory such as a Random Access Memory (RAM).

The resonator 1303 of the wireless power transmitter 1300 may have a quality factor value greater than or equal to 100, and the resonator 1351 of the wireless power receiver may have a quality factor value greater than or equal to 50. As a result, the wireless power transmitter 1300 and the wireless power receiver 1350 have a coupling efficiency having a value greater than or equal to 0.3, and thus may be loosely coupled. Accordingly, the wireless power transmitter 1300 can transmit wireless power while maintaining substantially the same efficiency even though the arrangement position, the arrangement direction, and the number of wireless power receivers 1350 are changed.

The wireless power transmitter 1300 includes the impedance matching circuit unit 1305, and accordingly may transmit wireless power while maintaining substantially the same efficiency even with the high quality factor.

The components included in the wireless power transmitter 1300 may be included within the wireless power transmission platform. The wireless power transmitter 1300 may further include a supporter for supporting the wireless power receiver 1350.

While the present invention has been shown and described with reference to certain embodiments thereof, it will be understood by those skilled in the art that various changes in form and details may be made therein without departing from the spirit and scope of the present invention as defined by the appended claims. Therefore, various modifications can be made to the present invention without departing from the subject of the present invention claimed in the appended claims, and the modifications should not construed separately from the technical idea or prospect of the present invention.

What is claimed is:

1. An apparatus for transmitting wireless power of a transmitter using a resonant coupling, the apparatus comprising:
   a transmission power converter which converts Direct Current (DC) power to Alternating Current (AC) power;
   a transmission resonator having a coil installed in the transmitter; and
   a controller which matches a frequency of the converted AC power and a resonant frequency of the transmission resonator by adjusting a Q factor of the transmission resonator,
   wherein the controller adjusts the Q factor by multiplying the resonant frequency of the transmission resonator by inductance of the coil and then dividing a result by a radiation loss due to a resistor of the transmission resonator, and
   wherein the transmission resonator wirelessly transmits the converted AC power to a receiver after the Q factor is adjusted.

2. The apparatus of claim 1, wherein the coil is installed in an inner side surface of the transmitter or an upper surface of a charging pad of the transmitter.

3. The apparatus of claim 1, wherein the controller controls an adaptive impedance matching.

4. The apparatus of claim 1, wherein the Q factor is calculated by $$Q = \frac{\omega L}{R},$$

where $\omega = 2\pi f$, f denotes the resonant frequency, L denotes the inductance of the coil, and R denotes the radiation loss.

5. The apparatus of claim 1, wherein the controller adjusts the Q factor by dividing the resonant frequency of the transmission resonator by a frequency of a point which is 3 dB lower than a maximum value of the converted AC power.

6. The apparatus of claim 1, wherein the Q factor is calculated by $$Q = \frac{f_r}{\Delta f},$$

where $f_r$ denotes the resonant frequency, $\Delta f$ denotes a bandwidth of a point which is 3 dB lower than power of the resonant frequency where the converted AC power has a maximum value.

7. The apparatus of claim 1, wherein the controller controls inductance and capacitance of the transmission resonator and controls an adaptive impedance matching by matching the resonance frequency changed according to a distance and an arrangement between the transmission resonator of the transmitter and a reception resonator of the receiver with the frequency of the AC power.

8. A method of transmitting wireless power of a transmitter using a resonant coupling, the method comprising:
   converting Direct Current (DC) power to Alternating Current (AC) power;

matching a frequency of the converted AC power and a resonant frequency of a transmission resonator of the transmitter by adjusting a Q factor of the transmission resonator; and wirelessly transmitting the converted AC power to a receiver through the transmission resonator after the Q factor is adjusted, wherein a coil is installed in the transmitter, and wherein adjusting the Q factor comprises multiplying the resonant frequency of the transmission resonator by inductance of the coil and then dividing a result by a radiation loss due to a resistor of the transmission resonator.

9. The method of claim 8, further comprising controlling an adaptive impedance matching.

10. The method of claim 8, wherein adjusting the Q factor further comprises dividing the resonant frequency of the transmission resonator by a frequency of a point which is 3 dB lower than a maximum value of the converted AC power.

11. The method of claim 8, wherein adjusting the Q factor further comprises controlling inductance and capacitance of the transmission resonator by matching the resonance frequency changed according to a distance and an arrangement between the transmission resonator of the transmitter and a reception resonator of the receiver with the frequency of the AC power.

* * * * *